United States Patent [19]

Efimushkin et al.

[11] 4,173,040

[45] Oct. 30, 1979

[54] DC-TO-AC VOLTAGE CONVERTER

[76] Inventors: Jury A. Efimushkin, ulitsa Shelkovichnaya, 182-a, kv. 28; Anatoly A. Borzov, ulitsa Novouzenskaya, 147, kv. 33; Veniamin D. Kanunnikov, ulitsa Mezhdunarodnaya, 14, kv. 19, all of Saratov, U.S.S.R.

[21] Appl. No.: 916,785

[22] Filed: Jun. 19, 1978

[30] Foreign Application Priority Data

Jun. 21, 1977 [SU] U.S.S.R. .............................. 2498814

[51] Int. Cl.² ......................................... H02M 7/537
[52] U.S. Cl. ..................................... 363/97; 363/134
[58] Field of Search .................. 331/113 R, 114, 144; 363/97, 131, 133, 23, 25

[56] References Cited

U.S. PATENT DOCUMENTS

| 2,968,738 | 1/1961 | Pintell | 363/23 X |
| 3,417,311 | 12/1968 | Logan | 363/133 X |
| 3,758,841 | 9/1973 | Bourbeau | 363/97 X |

FOREIGN PATENT DOCUMENTS 1230119 12/1966 Fed. Rep. of Germany ............. 363/25

Primary Examiner—William M. Shoop
Attorney, Agent, or Firm—Fleit & Jacobson

[57] ABSTRACT

A dc-to-ac voltage converter built around a multivibrator wherein the emitters of its transistors are interconnected and the collectors are connected to the primary terminals of an output transformer, and comprising a parametric voltage regulator. The transformer also has a feedback winding connected to a rectifier having one of its terminals connected to a voltage divider whose center tap is coupled to the base of a composite transistor and whose other terminal is coupled to the point of connection of a ballast resistor and a Zener diode of the voltage stabilizer. The other terminal of the rectifier is connected to a terminal of the dc voltage source, to the free lead of the Zener diode and to the emitter of the composite transistor whose collector is coupled to the point of connection of the emitters of the multivibrator transistors. Connected to the other terminal of the dc voltage source is the center tap of the transformer primary winding.

1 Claim, 1 Drawing Figure

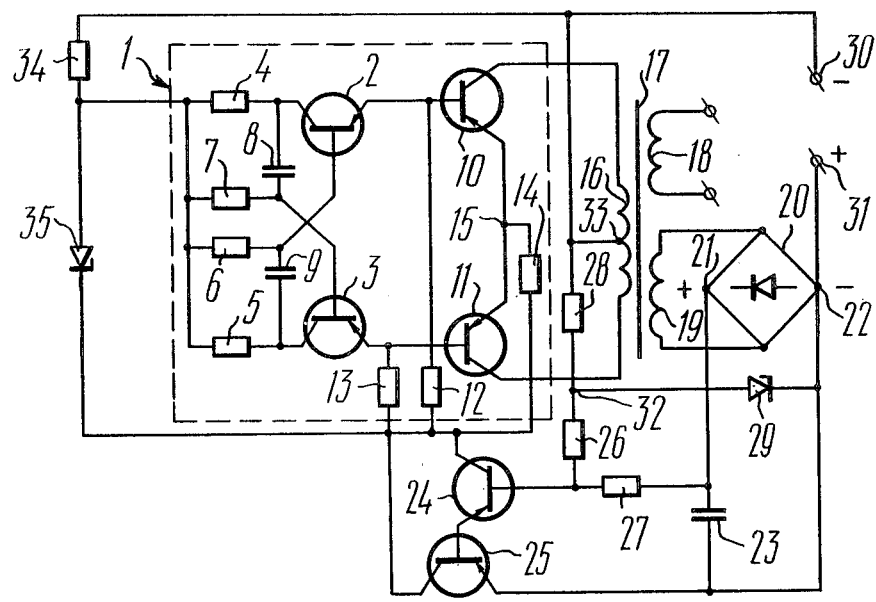

DC-TO-AC VOLTAGE CONVERTER

FIELD OF THE INVENTION

The present invention relates to dc voltage to ac voltage converters using semiconductor devices, and more particularly to dc-to-ac voltage converter which can be used in measuring instruments and power sources of electric apparatus as an ac voltage generator.

BACKGROUND OF THE INVENTION

Known in the art is a dc-to-ac converter built around a multivibrator associated with the output of a dc voltage source via a voltage regulator built around a composite transistor. The voltage regulator is provided with a parametric voltage stabilizer comprising a ballast resistor and a Zener diode. The emitters of the multivibrator transistors are interconnected, while the collectors are connected to the terminals of the primary winding of an output transformer also having a feedback winding. Also connected to the primary terminals of the transformer is a rectifier comprising a plurality of diodes arranged in a series opposition.

The converter includes an additional diode connected in a forward direction between the point of connection of the anodes of the rectifier diodes and the collector of the composite transistor (cf. USSR Inventor's Certificate No. 440,752; Cl. HO2m 3/24).

The prior art converter provides for normal operation when the supply voltage exceeds the rated value only 1.5 to 1.8 times. A further increase in the supply voltage, e.g. two- or three-fold (in particular, when the dc voltage increases from 9 to 30 V), adversely affects the operation of the parametric stabilizer and multivibrator transistors because the additional diode is rendered conducting, and the supply voltage is directly impressed upon the anodes of the diodes connected in series opposition and upon the ballast resistor of the parametric stabilizer.

As a result, the diodes of the rectifier are made non-conducting by the supply voltage which exceeds the voltage rectified by the diodes, while the Zener diode becomes connected to the dc voltage source via the ballast resistor.

This reduces the stability of the output ac voltage, and the power dissipated across the composite transistor of the voltage regulator substantially increases.

SUMMARY OF THE INVENTION

It is an object of the present invention to provide for stable operation of a dc-to-ac voltage converter in the case of wide supply voltage variations.

Another object of the invention is to improve the thermal conditions of operation of the converter transistors.

The present invention resides in that, in a dc-to-ac voltage converter built around a multivibrator associated with the output of a dc voltage source via a voltage regulator built around a composite transistor and provided with a parametric voltage stabilizer, the emitters of the multivibrator transistors being interconnected, while the collectors are connected to the terminals of a primary winding of an output transformer also having a feedback winding, according to the invention, the feedback winding of the output transformer is connected to a rectifier having one of its terminals connected to a terminal of a resistive voltage divider whose other terminal is coupled to the point of connection of a ballast resistor and a Zener diode of the parametric voltage stabilizer and whose centre tap is connected to the base of the composite transistor the collector whereof is coupled to the point of connection of the emitters of the multivibrator transistors, and the other terminal of the rectifier is connected to the free lead of the Zener diode, to the emitter of the composite transistor, and to a terminal of the dc voltage source having its other terminal connected to the centre tap of the primary winding of the output transformer.

The proposed dc-to-ac voltage converter provides for stable operation at two-to three-fold variations in the supply voltage.

The thermal conditions of operation of the transistors are improved by the redistribution of the dc and ac powers in the converter by the transistors.

BRIEF DESCRIPTION OF THE ACCOMPANYING DRAWING

The invention will now be described in greater detail with reference to a specific embodiment thereof, taken in conjunction with the accompanying drawing which is an electric circuit diagram of a dc-to-ac converter according to the invention.

DETAILED DESCRIPTION OF THE INVENTION

Referring now to the accompanying drawing, the dc-to-ac converter comprises a transistorized multivibrator 1 using an RC-coupled circuit arrangement and having two transistors 2 and 3, a resistor 4 in the collector circuit of the transistor 2, a resistor 5 in the collector circuit of the transistor 3, a resistor 6 in the base circuit of the transistor 2, a resistor 7 in the base circuit of the transistor 3, as well as capacitors 8 and 9. The multivibrator 1 also includes two transistors 10 and 11 whose emitters are interconnected and whose bases are connected to the emitters of the transistors 2 and 3, respectively. Connected to the base of the transistor 10 is a resistor 12, while connected to that of the transistor 11 is a resistor 13. The other leads of the resistors 12 and 13 are interconnected and coupled, via a feedback resistor 14, to the point 15 of connection of the emitters of the transistors 10 and 11.

The collectors of the transistors 10 and 11 are connected to the terminals of a primary winding 16 of an output transformer 17. The terminals of a secondary winding 18 of the transformer 17 are the output terminals of the converter. The transformer 17 also has a feedback winding 19 whose terminals are connected to a rectifier 20 with terminals 21 and 22 wherebetween a filtre 23 is inserted.

The dc-to-ac voltage converter also comprises a voltage regulator built around a composite transistor 24, 25 whose collector is connected, via the feedback resistor 14, to the point 15 of connection of the emitters of the transistors 10 and 11, and whose base is connected to the centre tap of a voltage divider including resistors 26 and 27. The voltage regulator is provided with a parametric voltage stabilizer which is essentially a series circuit including a ballast resistor 28 and a Zener diode 29. The free lead of the resistor 28 is connected to a terminal 30 of a dc voltage source (not shown), while the free lead of the Zener diode 29 is connected to a terminal 31 of the same source. The point 32 of connection of the resistor 28 and the Zener diode 29 is coupled to the free lead of the resistor 26 of the voltage divider.

The other terminal of the voltage divider is connected to the terminal 21 of the rectifier 20, while the other terminal 22 of the latter is connected to the terminal 31 of the voltage source and to the emitter of the composite transistor 24, 25. The centre tap 33 of the primary winding 16 is connected to the terminal 30 of the voltage source, whereto there is also connected one lead of a resistor 34. The other lead of the latter is connected to a lead of a Zener diode 35 and to the free leads of the resistors 4, 5, 6 and 7. The other lead of the Zener diode 35 is coupled to the point of connection of the resistors 12, 13 and 14.

The proposed dc-to-ac voltage converter operates as follows:

After the multivibrator 1 built around the transistors 2,3 and 10, 11 has been energized with the supply voltage, it starts producing voltage pulses at a frequency determined by the rated resistances of the resistors 6 and 7 and the rated capacitances of the capacitors 8 and 9, whereby an ac voltage occurs across the windings of the transformer 17, having an amplitude determined by the dc source voltage values (across the terminals 30 and 31), by the voltage across the Zener diode 35 and the voltage drop across the composite transistor 24, 25.

The composite transistor 24, 25 operates in such a manner that, at the minimum value of the supply voltage, the composite transistor 24, 25 is thrown into conduction by the voltage applied via the resistor 26 from the Zener diode 29.

In this case, the amplitude of the ac voltage across the converter output is twice as great as that of the supply voltage.

As the supply voltage increases in magnitude, the voltage across the transistors 10 and 11 of the multivibrator 1 increases, too, and the amplitude of the ac voltage across the windings 18 and 19 becomes greater. At the same time, the voltage between the terminals 21 and 22 of the rectifier 20 increases, and the total current flowing from the rectifier 20 and the Zener diode 29 through the resistors 26 and 27 as well as through the base-emitter junction of the composite transistor 24, 25 decreases. As a result, the latter becomes nonconducting, and the voltage drop across the collector-emitter junction of the transistor 25 increases. Thus, the voltage between the transistors 10 and 11 of the multivibrator 1 as well as the transistor 25 is redistributed, whereby the amplitude of the ac voltage across the converter output decreases to its initial magnitude.

When a load is connected to the converter, in the case of a higher dc supply voltage, the dc component of the current flowing through the transistors 10 and 11 of the multivibrator 1 increases, while the amplitude of the ac component remains the same. This is due to the fact that, when the load is connected, the increase in the voltage drop across the transistors 10 and 11 and the windings of the output transformer 17 causes a decrease in the output voltage and the voltage across the feedback winding 19, hence, the composite transistor 24, 25 becomes conducting, and the voltage drop thereacross decreases. As a result, the ac voltage across the output winding 18 returns to its former value. This brings about a redistribution of the power dissipated across the transistors 10 and 11 as well as the transistor 25, whereby the thermal conditions of operation of these transistors become more favourable.

The proposed converter can be advantageously used as an ac voltage generator in measuring instruments.

In particular, the use of the proposed converter in that capacity, in a microresistance meter, has made it possible to considerably broaden the range of variations in the supply voltages and to ensure the possibility of coupling the meter to any dc source from 9 to 30 V without any accessories. Tests of the microresistance meter have shown that, as the supply voltage varies from 9 to 30 V, the measurement error due to the voltage increase remained within 2%; when the load was disconnected (no-load conditions), the amplitude of the voltage across the collectors of the transistors 10 and 11, with the supply voltage being 30 V, did not exceed that which normally occurs at a supply voltage of 9 V.

The redistribution of the power dissipated across the transistors 10 and 11 as well as the transistor 25 has made it possible to rationalize the design of radiators and to reduce the meter weight.

What is claimed is:

1. A dc-to-ac voltage converter comprising: a multivibrator; transistors of said multivibrator; emitters of said transistors, which are interconnected; an output transformer; a primary winding of said transformer; collectors of said transistors, connected to the terminals of said primary winding; a secondary winding of said transformer, which is the output winding of said converter; a feedback winding of said transformer; a rectifier having input and output terminals, having said input terminals connected to the terminals of said feedback winding; a dc voltage source; a first terminal of said source; second terminal of said source; a composite transistor; a collector of said composite transistor, electrically associated with the point of connection of said transistors; an emitter of said composite transistor, connected to said first terminal of said source; a parametric voltage stabilizer; a Zener diode of said parametric voltage stabilizer, having one of its leads connected to said first terminal of said source; a ballast resistor of said parametric voltage stabilizer, having one of its leads connected to the free lead of said Zener diode and the other lead connected to said second terminal of said source; said other lead of said ballast resistor being coupled to the centre tap of said primary winding of said transformer; a resistive voltage divider having one of its terminals connected to the first one of said output terminals of said rectifier and the other terminal connected to the first one of said leads of said ballast resistor; the centre tap of said divider being electrically associated with the base of said composite transistor; the second one of said output terminals of said rectifier being connected to said first terminal of said dc voltage source.

* * * * *